(12) United States Patent
Yasui

(10) Patent No.: US 9,116,695 B2
(45) Date of Patent: Aug. 25, 2015

(54) STORAGE MEDIUM STORING INPUT/OUTPUT SETTING PROGRAM, STORAGE MEDIUM STORING OUTPUT SETTING PROGRAM, AND DATA PROCESSING APPARATUS

(71) Applicant: Ryo Yasui, Nagoya (JP)

(72) Inventor: Ryo Yasui, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 268 days.

(21) Appl. No.: 13/761,731

(22) Filed: Feb. 7, 2013

(65) Prior Publication Data

US 2013/0227192 A1    Aug. 29, 2013

(30) Foreign Application Priority Data

Feb. 27, 2012    (JP) .................................. 2012-040479

(51) Int. Cl.
*G06F 13/40* (2006.01)
*G06F 1/32* (2006.01)
*G06F 13/38* (2006.01)
*G06F 13/42* (2006.01)

(52) U.S. Cl.
CPC ............ *G06F 1/3212* (2013.01); *G06F 1/3287* (2013.01); *G06F 13/382* (2013.01); *G06F 13/4022* (2013.01); *G06F 13/4282* (2013.01); *Y02B 60/1228* (2013.01); *Y02B 60/1235* (2013.01)

(58) Field of Classification Search
CPC . G06F 1/3212; G06F 1/3287; G06F 13/4022; G06F 13/382; G06F 13/4282
USPC .......................................................... 710/316
See application file for complete search history.

(56) References Cited

U.S. PATENT DOCUMENTS

| | | | |
|---|---|---|---|
| 7,421,602 B2 * | 9/2008 | Sutardja .......................... | 713/324 |
| 7,721,118 B1 * | 5/2010 | Tamasi et al. .................. | 713/300 |
| 7,831,850 B2 * | 11/2010 | LeProwse et al. ............ | 713/320 |
| 8,090,964 B2 * | 1/2012 | Kitajima ........................ | 713/300 |
| 8,213,415 B2 * | 7/2012 | Hiroki ............................ | 370/352 |
| 2003/0100308 A1 * | 5/2003 | Rusch ............................ | 455/445 |
| 2005/0096086 A1 * | 5/2005 | Singamsetty ................... | 455/557 |
| 2006/0034253 A1 * | 2/2006 | Yurugi et al. .................. | 370/352 |

(Continued)

FOREIGN PATENT DOCUMENTS

| | | |
|---|---|---|
| JP | H7-141069 A | 6/1995 |
| JP | 2008-254285 A | 10/2008 |
| JP | 2011-59750 A | 3/2011 |

*Primary Examiner* — Ryan Stiglic
(74) *Attorney, Agent, or Firm* — Scully, Scott, Murphy & Presser, P.C.

(57) ABSTRACT

A non-transitory computer readable medium stores instructions that, when executed, cause a data processing apparatus, which includes a first input/output section and which is driven by a battery, to: judge whether the first input/output section is set as the input/output section; judge whether the remaining battery level of the battery is not less than a first reference remaining level; judge whether the data processing apparatus includes a second input/output section requiring a power consumption lower than that of the first input/output section; and switch or output a notification to switch the input/output section from the first input/output section to the second input/output section, in a case that the first input/output section is set as the input/output section; that the remaining battery level is less than the first reference remaining level; and that the data processing apparatus includes the second input/output section.

9 Claims, 11 Drawing Sheets

(56) References Cited

U.S. PATENT DOCUMENTS

2006/0094461 A1* 5/2006 Hameed et al. ............ 455/552.1
2007/0081486 A1* 4/2007 Koide ........................... 370/328
2012/0060043 A1* 3/2012 Kim et al. ..................... 713/320
2013/0198541 A1* 8/2013 Rabii ............................ 713/320

* cited by examiner

STORAGE MEDIUM STORING INPUT/OUTPUT SETTING PROGRAM, STORAGE MEDIUM STORING OUTPUT SETTING PROGRAM, AND DATA PROCESSING APPARATUS

CROSS REFERENCE TO RELATED APPLICATION

The present application claims priority from Japanese Patent Application No. 2012-040479, filed on Feb. 27, 2012, the disclosure of which is incorporated herein by reference in its entirety.

BACKGROUND OF THE INVENTION

1. Field of the Invention

The present invention relates to a technique by which an electric power consumed by input/output of data is saved in a data processing apparatus which is driven by a battery.

2. Description of the Related Art

There has conventionally been known a data processing apparatus driven by a battery as follows. That is, in a case that a remaining battery level is sufficient, image data to be transmitted to an image processing apparatus is/are selected by a user; in a case that the remaining battery level is insufficient, a transmittable number of image data is/are selected and then is transmitted to the image processing apparatus within a range of the remaining battery level.

SUMMARY OF THE INVENTION

However, in the conventional data processing apparatus as described above, there has never been considered that the electric power required for transmission of the image data is saved in a case that the remaining battery level is insufficient.

In the present description, it is disclosed a technique as follows. That is, in a data processing apparatus driven by a battery, an electric power consumed by input/output of data is saved in a case that a remaining battery level is insufficient.

According to an aspect of the present teaching, there is provided a non-transitory computer readable medium storing instructions that, when executed, cause a data processing apparatus, which includes a first input/output section for performing input/output of a data and which is driven by a battery, to: judge whether the first input/output section is set as the input/output section used for the input/output of the data; judge whether a remaining battery level of the battery is not less than a first reference remaining level; judge whether the data processing apparatus includes a second input/output section requiring a power consumption which is used for the input/output of the data and which is lower than that of the first input/output section, in a case that the data processing apparatus judges that the first input/output section is set as the input/output section used for the input/output of the data and that the remaining battery level is less than the first reference remaining level; and switch the input/output section from the first input/output section to the second input/output section or output a notification to switch the input/output section from the first input/output section to the second input/output section, in a case that the data processing apparatus judges that the data processing apparatus includes the second input/output section.

According to the instructions stored in the non-transitory computer readable medium, in the data processing apparatus driven by the battery, the electric power consumed by the input/output of the data is saved in a case that the remaining battery level is insufficient.

Noted that the technique disclosed in the present description can be realized in various aspects such as a data processing apparatus, an input/output setting method, an output setting method, a non-transitory computer readable medium storing an input/output setting program, and a non-transitory computer readable medium storing an output setting program.

DESCRIPTION OF THE PREFERRED EMBODIMENTS

Illustrative embodiments are described in detail with reference to the accompanying drawings.

First Embodiment

Electrical Structure of Personal Computer

Figure 1:
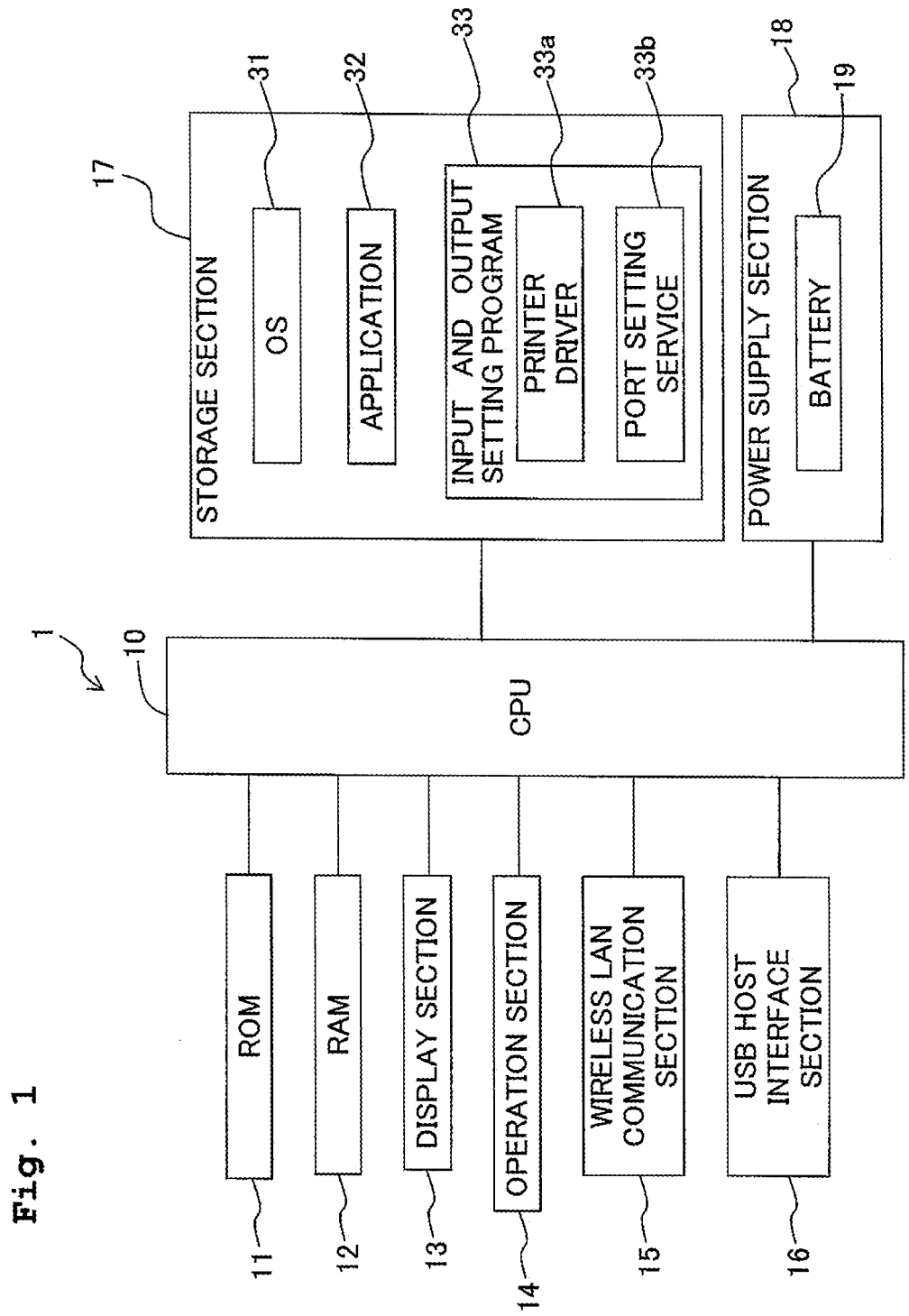
FIG. 1 is a block diagram depicting an electrical structure of a portable personal computer in the first embodiment according to one or more aspects of the disclosure.

As depicted in FIG. 1, a portable personal computer 1 (referred to as a portable PC1) as a data processing apparatus is driven by a battery 19. The portable PC1 is provided with a CPU 10, a ROM 11, a RAM 12, a display section 13, an operation section 14, a wireless LAN communication section 15, a USB host interface section 16, a storage section 17, and a power supply section 18, etc.

In one aspect, the CPU 10 controls each of the sections of the portable PC 1 by executing a program stored in the ROM 11 or the storage section 17. In one aspect, program(s), data, and the like to be executed by the CPU 10 are stored in the ROM 11. In one aspect, the RAM 12 is utilized as a main storage device to execute various processes by the CPU 10. The CPU 10 is an example of a controller.

In one aspect, the display section 13 is provided with a display device such as a liquid crystal display, a display driving circuit driving the display device, and the like. In one aspect, the operation section 14 is constructed of a keyboard, a mouse, an interface to which the keyboard and/or the mouse are connected, etc.

In one aspect, the storage section 17 is a device which utilizes a nonvolatile memory, such as a hard disk and/or a flush memory, to store various programs and data. In the storage section 17, an operating system (referred to as an OS) 31, an application program (referred to as an application) 32, an input/output setting program 33, etc., are stored.

As the OS 31, it is possible to use, for example, WINDOWS (trade name) produced by Microsoft Corporation. Noted that the OS 31 is not limited to the WINDOWS. The application 32 may be any program, such as a word processor and/or spread sheet software, provided that the program has a function for outputting to-be printed data to a printer driver 33a via the OS 31. The input/output setting program 33 is constructed of the printer driver 33a which controls a printer 2 (see FIG. 2) and a port-setting service program (referred to as a port setting service) 33b which instructs the OS 31 to set the input/output port as will be described later on. The input/output setting program 33 may be obtained from an external storage medium, such as a CD-ROM or a USB memory, or may be downloaded from an external device on the network such as a web server.

In one aspect, the wireless LAN communication section 15 is configured to include a diversity antenna and ASIC, etc. The wireless LAN communication section 15 is connected wirelessly to a wireless LAN access point 51 (see FIG. 2) by a protocol such as IEEE802.11b. The wireless LAN communication section 15 connected wirelessly to the wireless LAN access point 51 carries out data transmission and data reception with an external device by Transmission Control Protocol/Internet Protocol (TCP/IP). The transmission and reception of data is an example of input/output. Further, the wireless LAN communication section 15 is an example of a first input/output section.

In one aspect, the USB host interface section 16 is provided with a USB host controller and a physical interface, to which a USB cable 52 (see FIG. 2) and the USB memory etc. are connected, and the like. The USB host interface section 16 carries out the data transmission and the data reception with an external USB device which is directly connected to the USB host interface section 16 or an external USB device which is connected to the USB host interface section 16 via the USB cable 52.

The USB host interface section 16 is an example of a second input/output section. Further, the USB host interface section 16 is an example of the second input/output section, to which the external device is directly connected to input/output the data, as well as an example of the second input/output section, which is connected to the external device via a communication cable connected to the portable PC 1 to input/output the data.

Power consumption required for wired data transmission and wired data reception is generally lower than that required for wireless data transmission and wireless data reception. That is, the USB host interface section 16 is an input/output section requiring the power consumption used for the data transmission and the data reception which is lower than that of the wireless LAN communication section 15.

In one aspect, the power supply section 18 supplies an electric power supplied from a battery 19 to each of the sections of the portable PC 1. As the battery 19, a primary battery or a secondary battery may be used. Further, the power supply section 18 is configured to be obtained a remaining battery level of the battery 19 by the CPU 10.

<Switching of Input/Output Port>

As described above, the power consumption required for the data transmission and the data reception in the wireless LAN communication section 15 is greater than that in the USB host interface section 16. The greater power consumption required for the data transmission and the data reception shortens a period of time during which the portable PC 1 can be used, as compared with a case in which the power consumption required for the data transmission and the data reception is small. Further, the greater power consumption required for the data transmission and the data reception has a possibility such that the data transmission and the data reception are terminated due to running out of the battery during the data transmission and the data reception.

In view of the above, in a case that a printing instruction is output from the CPU 10 which executes the application 32 (referred to as the application 32); that the wireless LAN communication section 15 is set as the input/output section used for the transmission of printing data; and that the remaining battery level of the battery 19 is less than a first reference remaining level, the CPU 10 which executes the printer driver 33a (referred to as the printer driver 33a) performs a switching of the input/output section used for the transmission of the printing data from the wireless LAN communication section 15 to the USB host interface section 16. The first reference remaining level is, for example, 10% of full capacity of the battery 19. A value of the first reference remaining level can be appropriately selected.

There are various methods to perform the switching of the input/output section used for the transmission of the printing data. In the first embodiment, an explanation will be made by citing a case in which the switching of the input/output section is performed by performing a switching of a logical input/output port which is used to carry out the data transmission and the data reception. The input/output port can be referred to as a logical interface by which the printer driver 33a has access to the input/output section.

Figure 2:
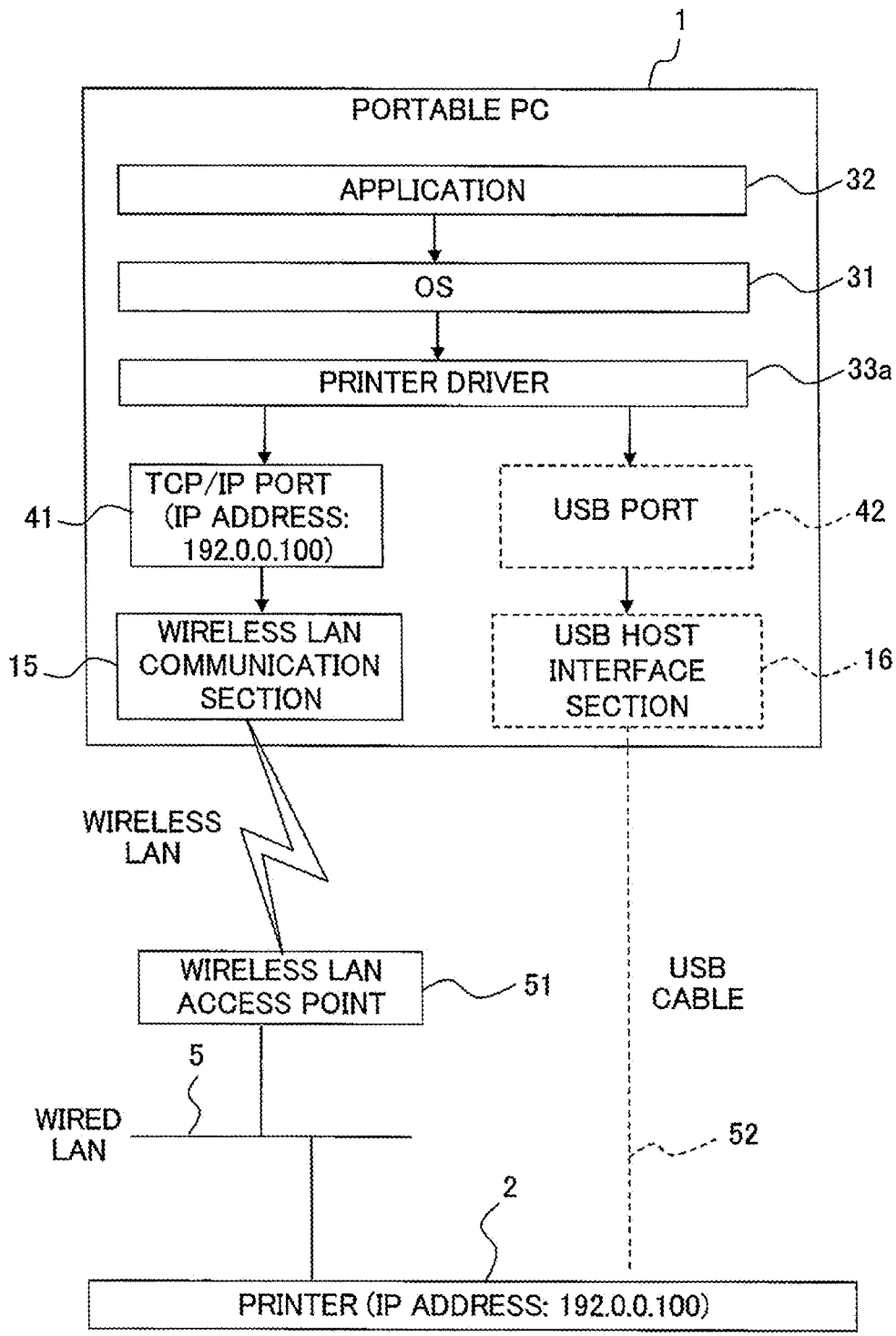
FIG. 2 is a diagram depicting an input/output port.

In FIG. 2, a TCP/IP port 41 which performs the data transmission and the data reception using the wireless LAN communication section 15; and a USB port 42 which performs the data transmission and the data reception using the USB host interface section 16 are shown as examples of the input/output ports. The TCP/IP port 41 is an example of the first input/output port. The USB port 42 is an example of the second input/output port. In order to transmit the printing data from the printer driver 33a to the printer 2, some sort of port is required to be set. Therefore, in the present description, an explanation will be made on the condition that the port is set in advance in the printer driver 33a.

One input/output port used for the data transmission and the data reception is set in the printer driver 33a. FIG. 2 depicts a case in which the TCP/IP port 41 is set in the printer driver 33a. In particular, the TCP/IP port 41 and the wireless LAN communication section 15 are depicted by solid lines; and the USB port 42 and the USB host interface section 16 are depicted by broken lines. In this case, in a case that the to-be printed data is outputted from the application 32 via the OS 31, the printer driver 33a generates the printing data from the outputted to-be printed data; and transmits the generated printing data to the printer 2 by using the TCP/IP port 41. It is allowable that the printer driver 33a outputs the printing data to the OS 31 and the OS 31 transmits the printing data by using the TCP/IP port 41.

As shown in FIG. 2, an IP address of the printer 2 to which the printing data is transmitted is set in the TCP/IP port 41. Accordingly, the printer driver 33a is capable of uniquely identifying the printer 2 to which the printing data is transmitted.

It is possible to perform the switching of the input/output port set in the printer driver 33a. For example, in a case that the input/output port is switched to the USB port 42 from the TCP/IP port 41, the printer driver 33*a* transmits the printing data to the printer 2 from the USB host interface section 16 via the USB cable 52.

Figure 3:
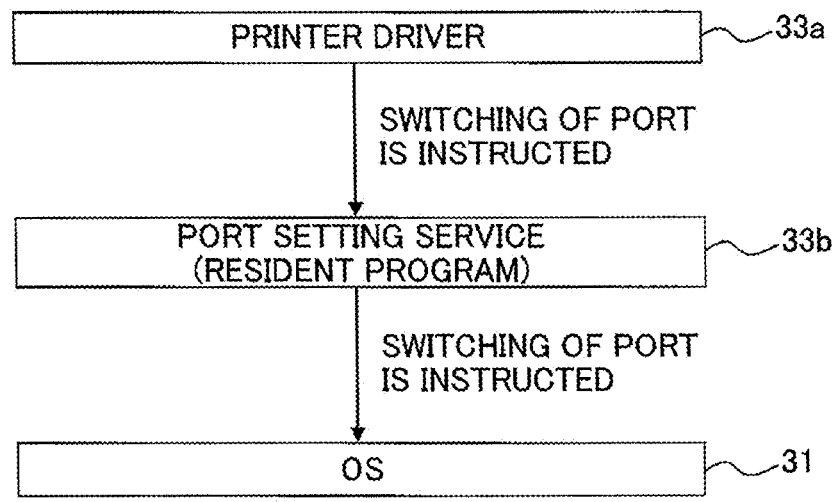
FIG. 3 is a diagram depicting a switching of the input/output port.

The switching of the input/output port set in the printer driver 33*a* will be explained by referring to FIG. 3. The switching of the input/output port can be performed as follows. That is, the printer driver 33*a* instructs the OS 31 to perform the switching of the input/output port via an API provided by the OS 31. Further, the switching of the input/output port can be performed also as follows. That is, the user instructs the OS 31 to perform the switching of the input/output port on an unillustrated setting screen displayed by the OS 31. In this embodiment, it is assumed that the printer driver 33*a* instructs the OS 31 to perform the switching of the input/output port via the API.

In OSes, there is an OS which does not accept the instruction of the switching of the input/output port from the printer driver 33*a* in a case that the printer driver 33*a* is not executed under a system account superior to a user account. The OS 31 of this embodiment is assumed to be the OS which does not accept the instruction of the switching, in a case that the printer driver 33*a* is not executed under the system account.

However, in a case that only the user account is given to the user who is logged in the OS 31, the printer driver 33*a* is executed under the user account. Therefore, in a case that the instruction of the switching from the printer driver 33*a* which is executed under the user account is not accepted, the switching of the input/output port can not be performed. In view of this, the printer driver 33*a* instructs the OS 31 to perform the switching of the input/output port via the port setting service 33*b*. The port setting service 33*b* is a program which instructs the OS 31 to set the input/output port designated by the printer driver 33*a* in the printer driver 33*a*. The port setting service 33*b* is set by a system administrator to be executed under the system account. Then, the port setting service 33*b* is started by the OS 31 when the OS 31 is started; and the port setting service 33*b* is resident in the RAM 12 as a service or a daemon.

In a case that the system account is given to the user, the printer driver 33*a* may give a direct instruction to the OS 31 to perform the switching of the input/output port without using the port setting service 33*b*.

<Switching Process of Input/Output Port by Printer Driver>

Figure 4A:
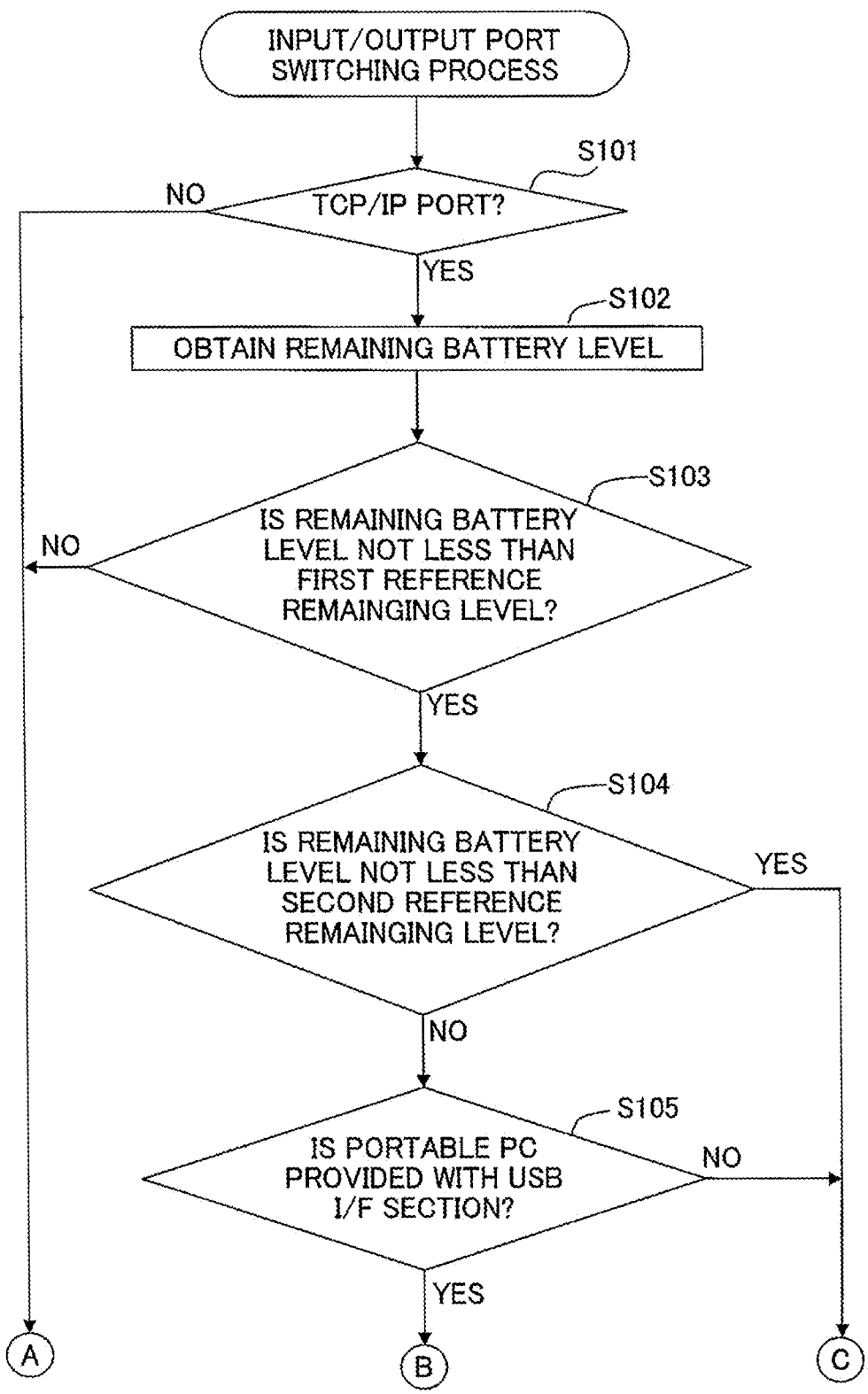
FIGS. 4A and 4B show a flowchart depicting a switching process of the input/output port.
Figure 4B:
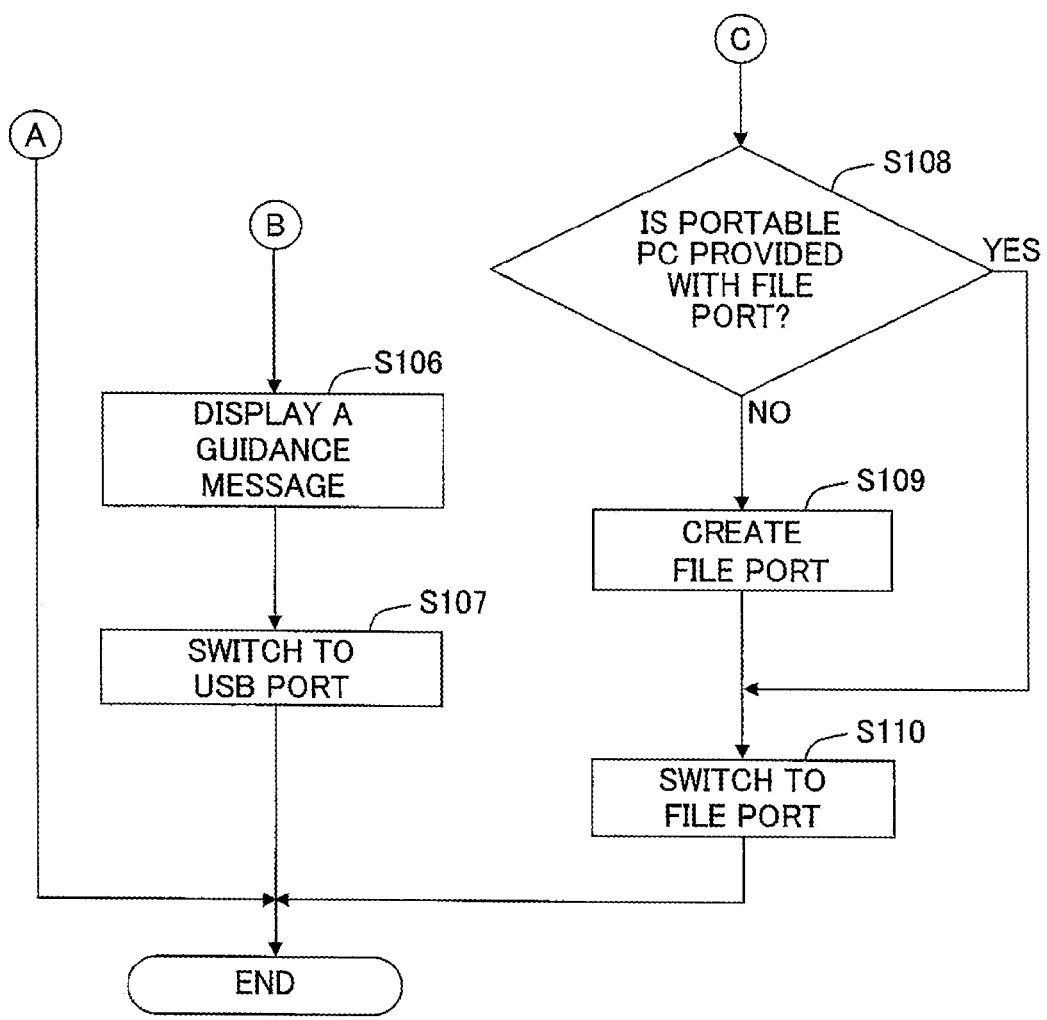

A switching process of the input/output port by the printer driver 33*a* as shown in FIGS. 4A and 4B is executed after the to-be printed data is outputted from the application 32 to the printer driver 33*a* and before the printing data is outputted from the printer driver 33*a* to the printer 2.

The portable PC 1, which is the data processing apparatus according to the first embodiment, is provided with both the wireless LAN communication section 15 and the USB host interface section 16. However, the USB host interface section 16 is not always provided for all of the data processing apparatuses. In view of this, in the switching process of the input/output port according to the first embodiment, an explanation will be made on the assumption that the portable PC 1 is not provided with the USB host interface section 16 in some cases.

In S101, the printer driver 33*a* judges as to whether or not the input/output port set in the printer driver 33*a* is the TCP/IP port 41. This judgment can be performed by obtaining information, which indicates the input/output port set in the printer driver 33*a*, from the OS 31. S101 is an example of a process for judging the input/output section. In a case that it is judged that the TCP/IP port 41 is set in the printer driver 33*a*, the process of S102 is executed by the printer driver 33*a*. In a case that it is judged that the TCP/IP port 41 is not set in the printer driver 33*a*, that is, in a case that a USB port, a file port, a serial port, or the like is set in the printer driver 33*a*, this process is completed.

In S102, the printer driver 33*a* obtains the remaining battery level of the battery 19. In S103, the printer driver 33*a* judges as to whether or not the remaining battery level obtained in S102 is not less than the first reference remaining level. In a case that the remaining battery level obtained in S102 is not less than the first reference remaining level, this process is completed by the printer driver 33*a*. In a case that the remaining battery level obtained in S102 is less than the first reference remaining level, the process of S104 is executed by the printer driver 33*a*. The first reference remaining level may be set in the printer driver 33*a* fixedly or may be set by the user instruction. Further, it is also possible to set a value of the first reference remaining level appropriately. In S104, the printer driver 33*a* judges as to whether or not the remaining battery level obtained in S102 is not less than a second reference remaining level which is smaller than the first reference remaining level. The second reference remaining level is, for example, 5% of the full capacity of the battery 19. Similar to the first reference remaining level, the second reference remaining level can be set as appropriate. In a case that the remaining battery level is not less than the second reference remaining level, the process of S105 is executed by the printer driver 33*a*. In a case that the remaining battery level is less than the second reference remaining level, the process of S108 is executed by the printer driver 33*a*. The process including S102 to S104 as described above is an example of a process for judging the remaining battery level.

In S105, the printer driver 33*a* judges as to whether or not the portable PC 1 is provided with the USB host interface section ("USB I/F section" in FIG. 4A) 16. In a case that it is judged that the portable PC 1 is provided with the USB host interface section 16, the process of S106 is executed by the printer driver 33*a*. On the other hand, in a case that it is judged that the portable PC 1 is not provided with the USB host interface section 16, the process of S108 is executed by the printer driver 33*a*. S105 is an example of a process for judging presence or absence of the second input/output section.

In S106, the printer driver 33*a* guides the user so that the portable PC 1 and the printer 2 are connected by the USB cable 52. In particular, for example, the printer driver 33*a* displays an unillustrated message screen on the display section 13, such as "Low battery level. Connect printer to PC by USB cable and then click on OK button". In a case that the message screen is displayed, the user connects the printer 2 to the portable PC 1 by the USB cable 52 and then clicks on the OK button on the message screen. In a case that the user clicks on the OK button on the message screen, the process of S107 is executed by the printer driver 33*a*.

Here, in some cases, the USB port 42 is not created when the switching process of the input/output port is started. In a case that the USB port 42 is not created and that the user connects the printer 2 to the portable PC 1 by the USB cable 52, the USB port 42 is created automatically by the OS 31 by a PnP (Plug and Play) function provided for the OS 31. However, even when the OK button is clicked on the message screen, the USB cable 52 may not be actually plugged in in some cases. Therefore, in a case that the OK button is clicked on, the printer driver 33*a* may judge as to whether or not the USB cable 52 is actually plugged in. In a case that the USB cable 52 is not plugged in, this process may be canceled.

In S107, the printer driver 33*a* designates the USB port 42 to instruct the port setting service 33*b* to perform the switching of the input/output port.

In S108, the printer driver 33a judges as to whether or not the OS 31 is provided with the file port. The file port is a logical input/output port to write the data in the storage section 17. Further, since the file port does not transmit the data to the printer, it is possible to output the printing data from the printer driver 33a using the lower power consumption. The file port is an example of a third input/output section. In a case that the OS 31 is not provided with the file port, the process of S109 is executed by the printer driver 33a. In a case that the OS 31 is provided with the file port, the printer driver 33a skips over S109 and executes the process of S110.

In S109, the OS 31 is required to create the file port by the printer driver 33a. S109 is an example of a process for creating the input/output section. In a case that the system account is required when the file port is created, it is allowable that the printer driver 33a instructs the port setting service 33b to create the file port; and the port setting service 33b instructs the OS 31 to create the file port.

In S110, the printer driver 33a designates the file port to instruct the port setting service 33b to perform the setting of the input/output port. Each of S106, S107, and S110 as described above is an example of the switching process.

The above description corresponds to the flow of the switching process of the input/output port executed by the printer driver 33a. The printer driver 33a generates the printing data before or after the switching process of the input/output port as described above; and transmits the generated printing data to the printer 2 after the switching process of the input/output port.

Effect of First Embodiment

According to the printer driver 33a of the first embodiment as described above, in a case that the TCP/IP port 41 is set as the input/output port used for the transmission of the printing data and that the remaining battery level is less than the first reference remaining level, it is performed the switching of the input/output port used for the transmission of the printing data from the TCP/IP port 41 to the USB port 42 or the file port requiring the power consumption used for the transmission of the printing data which is lower than that of the TCP/IP port 41. Therefore, it is possible to save the electric power consumed by transmitting the printing data, in a case that the remaining battery level is insufficient in the portable PC 1 driven by the battery 19.

According to the printer driver 33a of the first embodiment, it is possible to perform the switching of the input/output section used for the input/output of the printing data by performing the switching of the input/output port.

Further, according to the printer driver 33a of the first embodiment, in a case that the switching of the input/output port used for the transmission of the printing data to the USB port 42 is performed, the printer driver 33a displays guidance message so that the user connects the USB cable 52 to the portable PC 1. Thus, it is possible to perform the input and the output of the data by the USB host interface section 16.

Further, according to the printer driver 33a of the first embodiment, in a case that the portable PC 1 is not provided with the USB host interface section 16, the file port to write the printing data in the storage section 17 is created; and the switching of the input/output port used for the output of the printing data to the file port is performed. By doing so, even when the portable PC 1 is not provided with the USB host interface section 16, it is possible to save the electric power consumed by the output of the printing data.

Further, according to the printer driver 33a of the first embodiment, in a case that the remaining battery level is less than the first reference remaining level and that the remaining battery level is not less than the second reference remaining level, the printing data is transmitted by using the USB port 42. Thus, it is possible to save the power consumption as compared with a case in which the printing data is transmitted by the TCP/IP port 41. On the other hand, in a case that the remaining battery level is less than the second reference remaining level, the printing data is written into the storage section 17 by using the file port. Thus, it is possible to save the power consumption as compared with a case in which the printing data is transmitted by the USB port 42. Accordingly, it is possible to perform the switching between the input/output ports having different amounts of power consumption depending on the remaining battery level.

Second Embodiment

Figure 5:
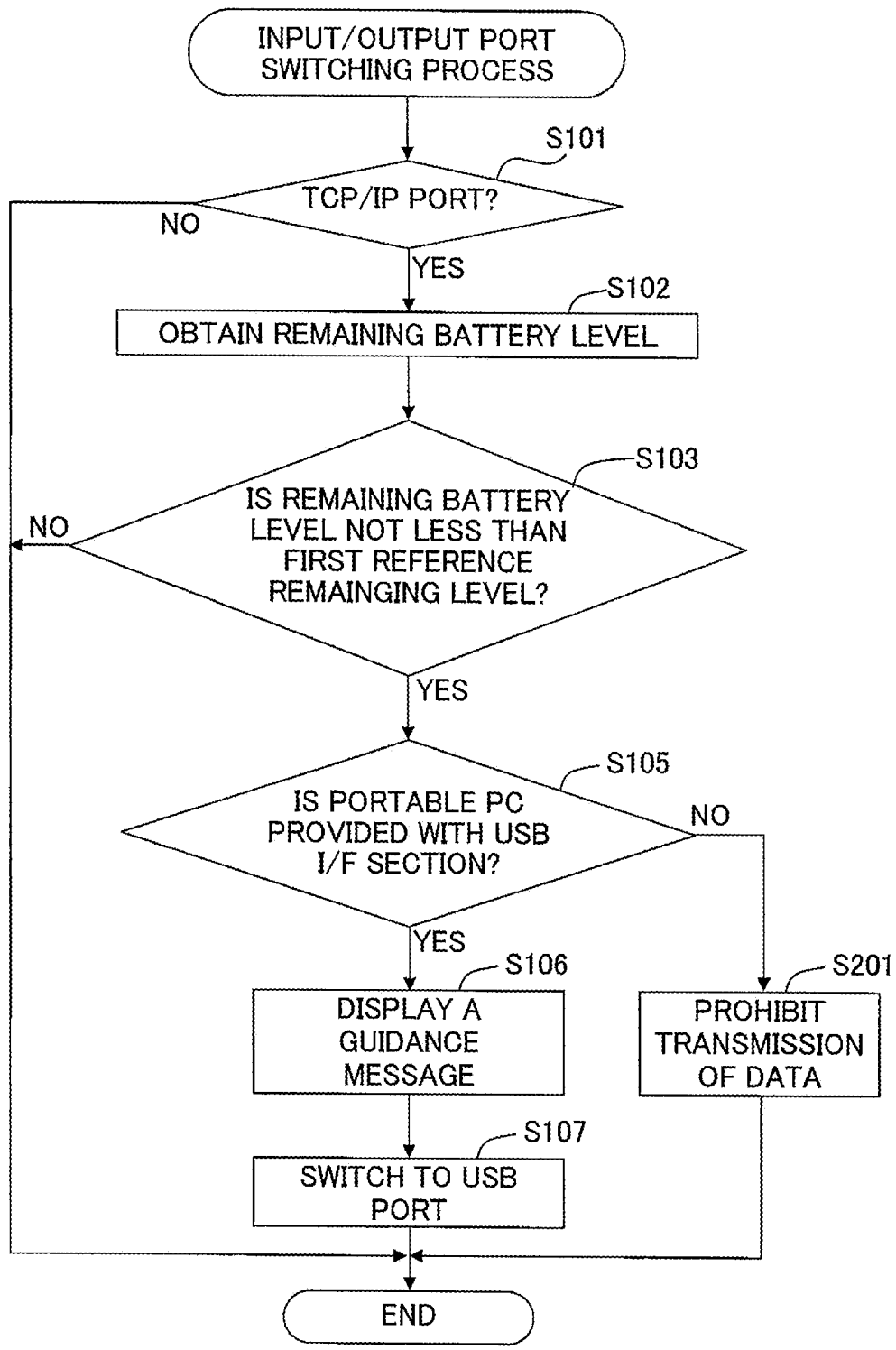
FIG. 5 is a flowchart depicting a switching process of the input/output port in the second embodiment according to one or more aspects of the disclosure.

Next, an explanation will be made about the second embodiment of the present teaching with reference to FIG. 5. In a case that the input/output port set in the printer driver 33a is the TCP/IP port 41 and that the remaining battery amount of the battery 19 is less than the first reference remaining level, the printer driver 33a according to the second embodiment judges as to whether or not the portable PC 1 is provided with the USB host interface section 16. In a case that the portable PC 1 is not provided with the USB host interface section 16, the transmission of the data is prohibited.

In the input/output port switching process according to the second embodiment, S104 of the first embodiment is not executed. Further, in the input/output port switching process according to the second embodiment, S201 is executed instead of the process including S108 to S110 in the first embodiment. Further, the printer driver 33a according to the second embodiment does not perform the output by the file port. Hereinbelow, in the flowchart of FIG. 5, the processes, which are the substantially same as or equivalent to those of the first embodiment, are designated by the same reference numerals, any explanation of which will be omitted.

In S201, the printer driver 33a prohibits the transmission of the printing data by the wireless LAN communication section 15. S201 is an example of a prohibition process. In a case that the transmission of the printing data by the wireless LAN communication section 15 is prohibited, the printer driver 33a does not transmit the printing data after the input/output port switching process.

Next, an explanation will be made about effects of the printer driver 33a according to the second embodiment. In a case that the portable PC 1 is not provided with the USB host interface section 16, the wireless LAN communication section 15 is set, as it is, as the input/output section used for the transmission of the printing data. In this case, since the printing data is transmitted by the wireless LAN communication section 15, there is fear that the transmission is terminated due to the running out of the battery before the transmission of the printing data is completed. In a case that the TCP/IP port 41 is set as the input/output port used for the transmission of the printing data; that the remaining battery level is less than the first reference remaining level; and that the portable PC 1 is not provided with the USB host interface section 16, the printer driver 33a of the second embodiment prohibits the transmission of the printing data. Thus, it is possible to reduce a possibility that the transmission of the printing data is terminated, which would be otherwise caused by the transmission of the printing data by the wireless LAN communication section 15.

Third Embodiment

Figure 6:
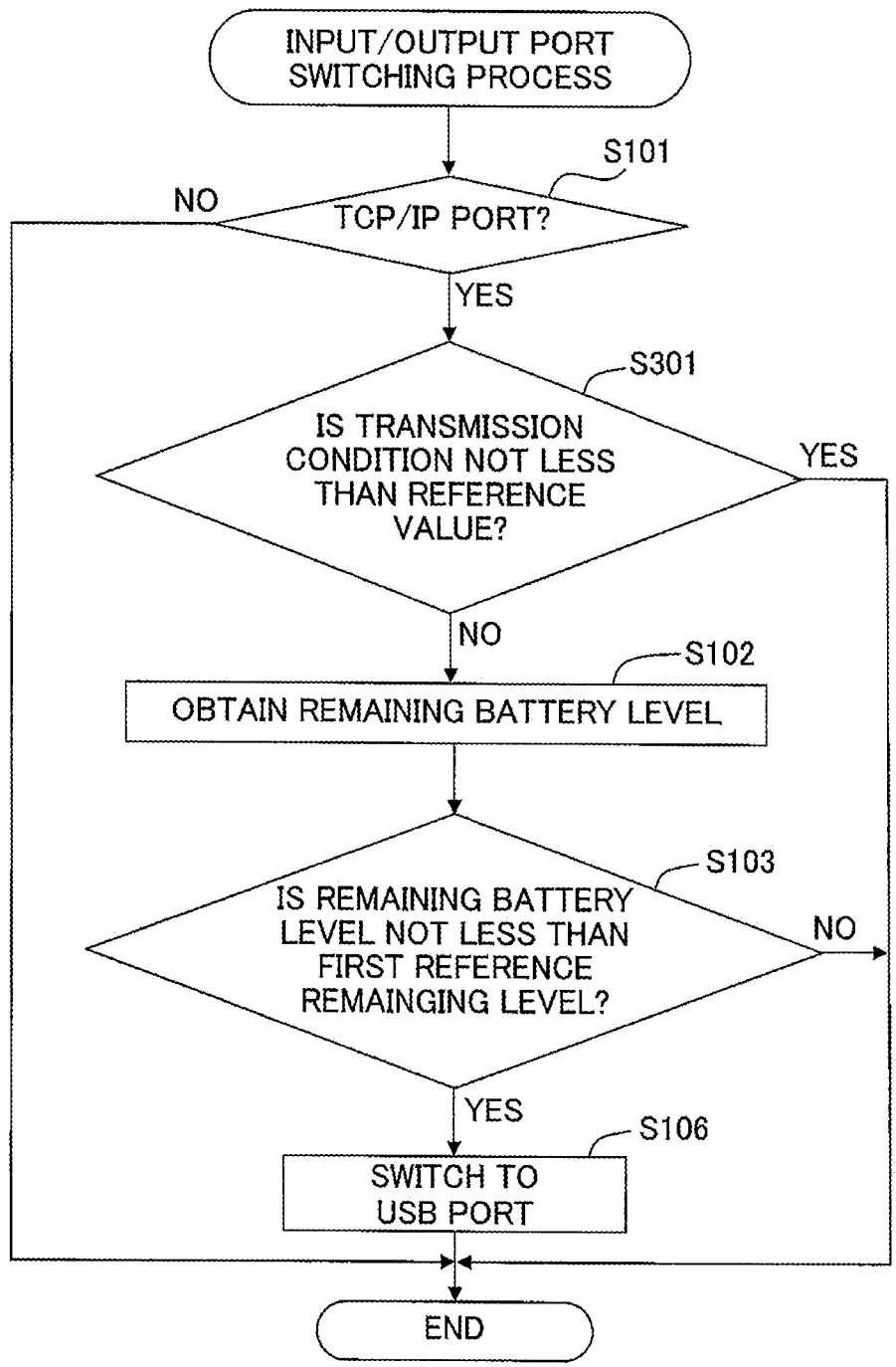
FIG. 6 is a flowchart depicting a switching process of the input/output port in the third embodiment according to one or more aspects of the disclosure.

Next, an explanation will be made about the third embodiment of the present teaching with reference to FIG. 6. In a case that the wireless LAN communication section 15 is set as the input/output section used for the transmission of the printing data and that transmission condition of the printing data by the wireless LAN communication section 15 is not less than a reference value, the printer driver 33a according to the third embodiment executes the process for judging the remaining battery level and the switching process in a similar manner to the printer driver 33a of the first embodiment. On the other hand, in a case that the wireless LAN communication section 15 is set as the input/output section used for the transmission of the printing data and that the transmission condition of the printing data by the wireless LAN communication section 15 is less than the reference value, the printer driver 33a of the third embodiment transmits the printing data by using the wireless LAN communication section 15 irrespective of the remaining battery level.

Here, "the transmission condition" refers to the number of times of transmission of the printing data, frequency of transmission of the printing data, and the like. "The number of times of transmission" may be, for example, the number of times of transmission after the battery 19 of the portable PC 1 is exchanged or charged most recently until the present time; or may be the number of times of transmission during the most recent three-hours period. "The frequency of transmission" may be, for example, the number of times of transmission per hour after the battery 19 of the portable PC 1 is exchanged or charged most recently; or may be the number of times of transmission per hour during the most recent three-hours period. Alternatively, the frequency of transmission may be the average of time intervals for transmitting the printing data, such as once for every ten minutes. "The transmission condition" is an example of the input/output condition. Further, "the number of times of transmission" is an example of the number of times of input/output; and "the frequency of transmission" is an example of the frequency of input/output.

In order to judge the transmission condition as described above, the printer driver 33a stores a transmission time in the storage section 17, every time when the printing data is transmitted by using the TCP/IP port 41. The transmission time stored in the storage section 17 is an example of a history of input/output. A process in which the transmission time is stored in the storage section 17 by the printer driver 33a is an example of a process for storing the history of input/output.

Hereinbelow, in the flowchart of FIG. 6, the processes, which are the substantially same as or equivalent to those of the first embodiment, are designated by the same reference numerals, any explanation of which will be omitted. Further, it is assumed that the portable PC 1 is provided with both the wireless LAN communication section 15 and the USB host interface section 16 so that the process in the third embodiment can be easily understood.

In S301, the printer driver 33a judges as to whether or not the transmission condition of the printing data by the TCP/IP port 41 is not less than the reference value. For example, it is assumed that the number of times of transmission during the most recent three-hours period is used as the transmission condition and that the reference value is set as ten times, the printer driver 33a judges as to whether or not the number of times of transmission during the most recent three-hours period is not less than 10 times. The reference value can be set as appropriate; and the transmission condition may include both the number of times of transmission and the frequency of transmission. For example, the following case is allowable. That is, the reference value depending on the number of times of transmission and the reference value depending on the frequency of transmission are set respectively; and in a case that at least one of the number of times of transmission and the frequency of transmission is not less than the reference value, it is judged that the transmission condition is not less than the reference value. In a case that the transmission condition is not less than the reference value, the process of S102 is executed by the printer driver 33a; and in a case that the transmission condition is less than the reference value, this process is completed.

According to the printer driver 33a of the third embodiment as described above, in a case that the wireless LAN communication section 15 is set as the input/output section used for the transmission of the printing data, the transmission condition of the printing data by the wireless LAN communication section 15 is judged. In a case that the transmission condition is less than the reference value, the printing data is transmitted by using the wireless LAN communication section 15 irrespective of the remaining battery level of the battery 19. In the case that the transmission condition is less than the reference value, the transmission of the printing data is assumed to be performed infrequently. In this case, even if the printing data is transmitted by using the wireless LAN communication section 15, the portable PC 1 may be less affected in its use. In a case that the wireless LAN communication section 15 is set as the input/output section used for the transmission of the printing data, it is assumed that the user desires to transmit the printing data by the wireless LAN. Therefore, by transmitting the printing data by using the wireless LAN communication section 15, it is possible to transmit the printing data by using the input/output section satisfying user's need without the great effect on the use of the portable PC 1.

Fourth Embodiment

Next, an explanation will be made about the fourth embodiment of the present teaching with reference to FIG. 7 and FIGS. 8A and 8B. In the first to third embodiments, explanations were made by citing a case in which the first input/output section is the wireless LAN communication section 15; and the second input/output section is the USB host interface section 16. In the fourth embodiment, however, an explanation will be made by citing a case in which the first input/output section is the wireless LAN communication section 15; and the second input/output section is a wired LAN communication section 70 (see FIG. 7). In the first to third embodiments, the switching of the input/output section is performed by performing the switching of the input/output port. However, the switching to the wired LAN communication section 70 from the wireless LAN communication section 15 can not be performed by performing the switching of the input/output port. Therefore, the printer driver 33a according to the fourth embodiment performs the switching to the wired LAN communication section 70 from the wireless LAN communication section 15 by performing a switching of a communication control program.

Figure 7:
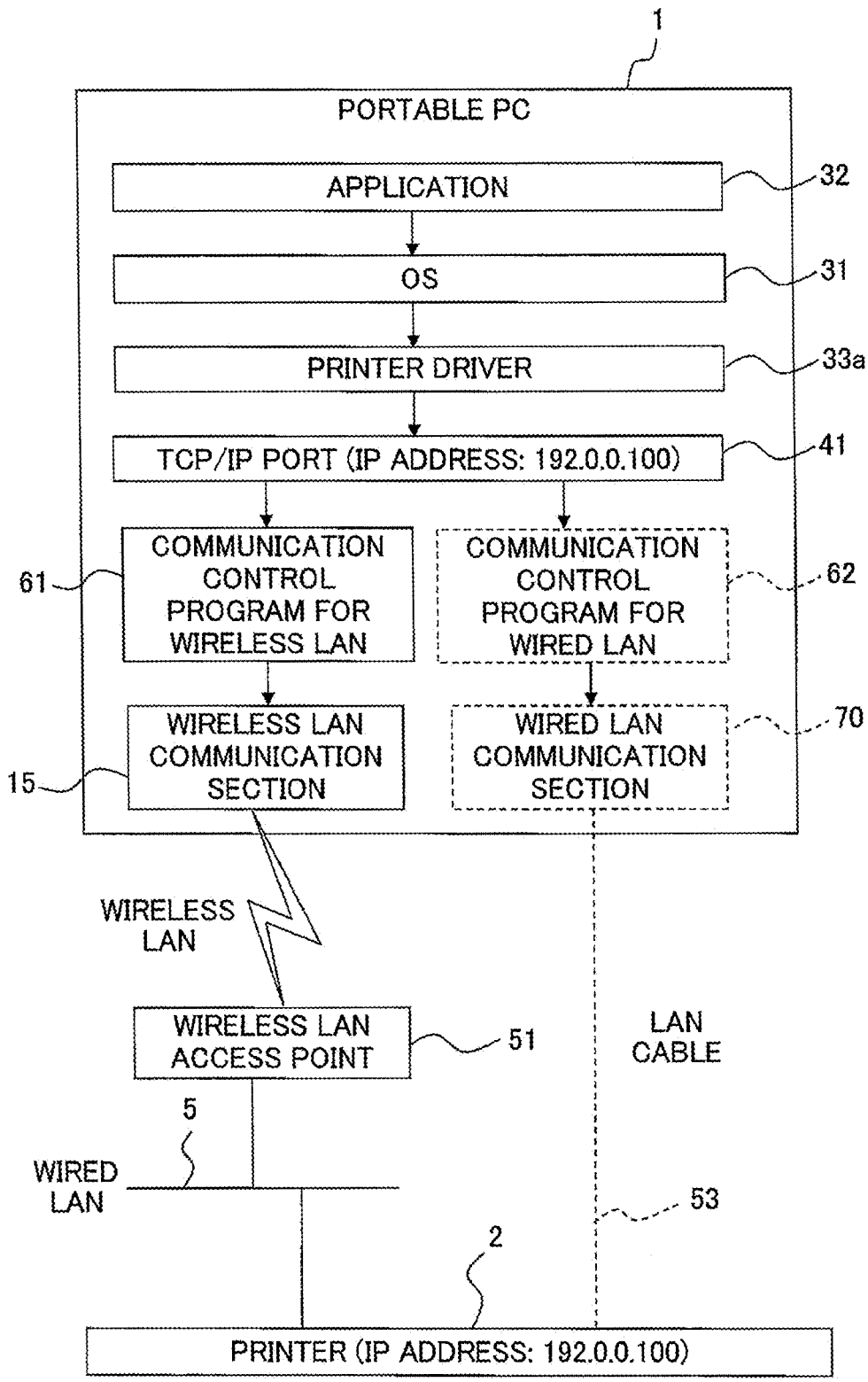
FIG. 7 is a diagram depicting a communication control program in the fourth embodiment according to one or more aspects of the disclosure.
Figure 8A:
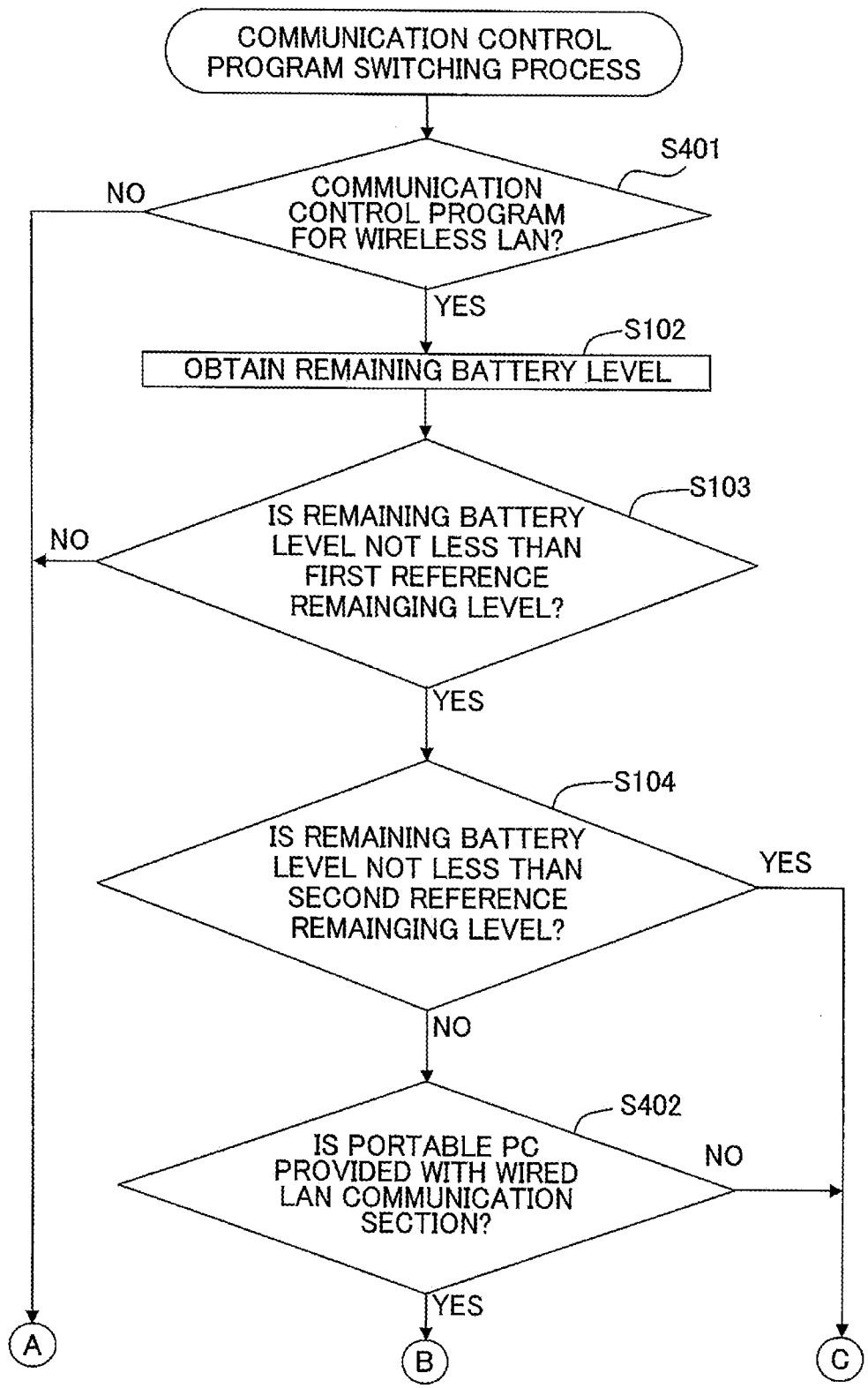
FIGS. 8A and 8B show a flowchart depicting a switching process of the communication control program.
Figure 8B:
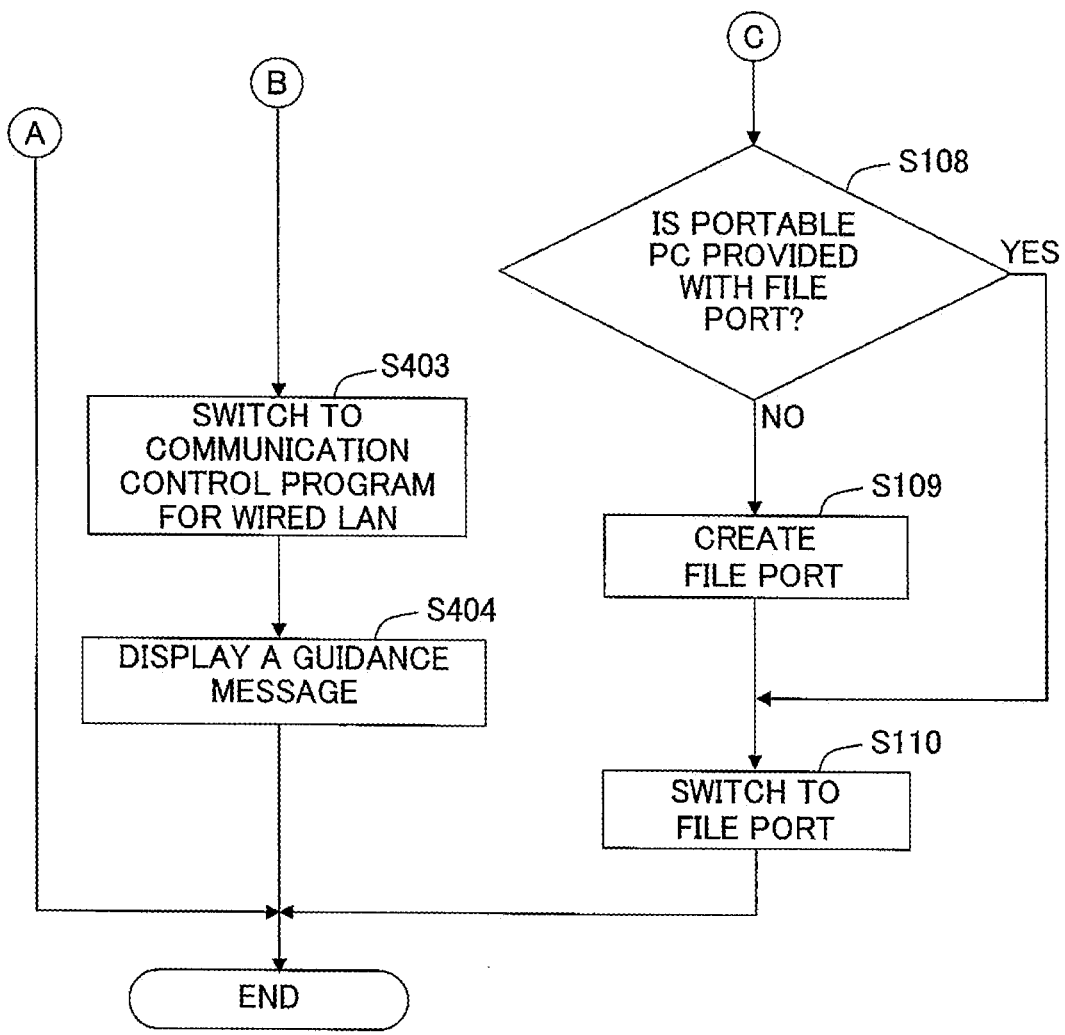

As shown in FIG. 7, a communication control program for the wireless LAN 61 which controls the wireless LAN communication section 15 and a communication control program for the wired LAN 62 which controls the wired LAN communication section 70 are stored in the portable PC 1. The communication control program refers to a program which controls the input/output section to perform the communication. The communication control program can be exemplified by a so-called protocol stack in which a hierarchically-defined communication protocol such as the TCP/IP is implemented. The communication control program can be referred to also as a communication driver. The communication control program for the wireless LAN 61 is an example of a first communication control program. The communication control program for the wired LAN 62 is an example of a second communication control program.

Hereinbelow, in the flowchart of FIGS. 8A and 8B, the processes, which are the substantially same as or equivalent to those of the switching process of the input/output port in the first embodiment, are designated by the same reference numerals, any explanation of which will be omitted.

In S401, the printer driver 33a judges as to whether or not the communication control program, which is set as the communication control program used for the input/output of the data, is the communication control program for the wireless LAN 61. In a case that the communication control program for the wireless LAN 61 is set, the printer driver 33a executes the process of S102. In a case that the communication control program for the wireless LAN 61 is not set, this process is completed. S401 is an example of the process for judging the input/output section. In S402, the printer driver 33a inquires of the OS 31 to judge as to whether or not the portable PC 1 includes the wired LAN communication section 70. In a case that the portable PC 1 includes the wired LAN communication section 70, the process of S403 is executed by the printer driver 33a. In a case that the portable PC 1 does not include the wired LAN communication section 70, the process of S108 is executed by the printer driver 33a. S402 is an example of the process for judging presence or absence of the second input/output section.

In S403, the printer driver 33a performs switching of the communication control program used for the transmission of the data from the communication control program for the wireless LAN 61 to the communication control program for the wired LAN 62. The switching can be performed such that the printer driver 33a instructs the OS 31 to perform the switching via, for example, the API provided by the OS 31. In S404, the printer driver 33a displays a guidance message to instruct the user to connect the portable PC 1 to a communication network 5 by a LAN cable 53.

According to the printer driver 33a of the fourth embodiment as described above, it is possible to perform the switching of the input/output section used for the input/output of the data by performing the switching of the communication control program.

Fifth Embodiment

Next, an explanation will be made about the fifth embodiment of the present teaching with reference to FIG. 9. The printer driver 33a of the fifth embodiment stores, in the storage section 17, the printing data which has been transmitted by the input/output section, as the printing data which has been printed (data which has been outputted). Then, in a case that the remaining battery level of the battery 19 is less than the first reference remaining level, the printer driver 33a judges as to whether or not the transmitted printing data which has been printed and stored in the storage section 17 has the same content as the printing data to be transmitted. In a case that the transmitted printing data has the same content as the printing data to be transmitted, the transmission (output) of the printing data to be transmitted is cancelled. The printer driver 33a according the fifth embodiment is an example of the output setting program. The same content referred to herein is that a file name of the printing data to be transmitted coincides with that of the transmitted printing data and/or that the data, of the printing data to be transmitted, which indicates a page to be printed on a printing paper sheet coincides with that of the transmitted printing data.

Figure 9:
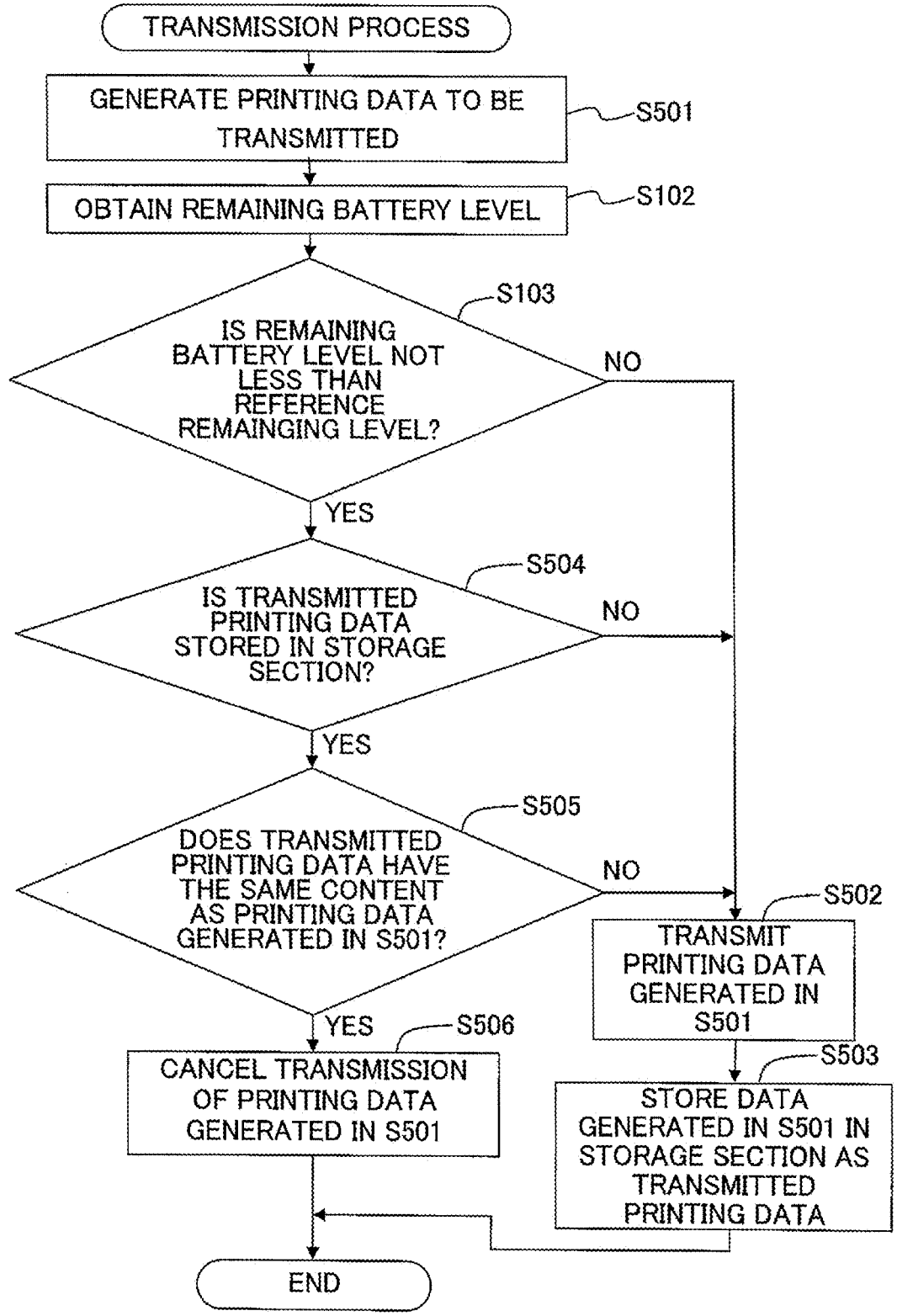
FIG. 9 is a flowchart depicting a transmission process in the fifth embodiment according to one or more aspects of the disclosure.

As shown in FIG. 9, a transmission process executed by the printer driver 33a according to the fifth embodiment is started when the printing is instructed to the printer driver 33a from the application 32 via the OS 31. A process, in which the printing instruction from the application 32 is received by the printer driver 33a, is an example of a receiving process.

Here, the portable PC 1 according to the fifth embodiment may transmit the printing data to the printer 2 by any input/output section. For example, the portable PC 1 may transmit the printing data by using the wireless LAN communication section 15, the wired LAN communication section 70, or the USB host interface section 16.

In S501, the printer driver 33a generates the printing data (data to be subjected to the transmission). In S102, the printer driver 33a obtains the remaining battery level of the battery 19. In S103, the printer driver 33a judges as to whether or not the remaining battery level obtained in S102 is not less than a reference remaining level. In a case that the remaining battery level obtained in S102 is not less than the reference remaining level, the process of S502 is executed by the printer driver 33a. In a case that the remaining battery level obtained in S102 is less than the reference remaining level, the process of S504 is executed by the printer driver 33a. The reference remaining level is, for example, 10% of full capacity of the battery 19. In S502, the printer driver 33a transmits the printing data generated in S501 to the printer 2. S502 is an example of the output process. In S503, the printer driver 33a stores the printing data generated in S501 as the data which has been printed (data which has been transmitted) in the storage section 17. S503 is an example of a storage process.

The processes of steps S504 to S506 are performed in a case that it is judged in S103 that the remaining battery level is less than the reference remaining level. In S504, the printer driver 33a judges as to whether or not the transmitted printing data is stored in the storage section 17. In a case that the transmitted printing data is stored in the storage section 17, the printer driver 33a executes the process of S505. In a case that the transmitted printing data is not stored in the storage section 17, the printer driver 33a executes the process of S502.

In S505, the printer driver 33a judges as to whether or not the transmitted printing data stored in the storage section 17 has the same content as the printing data generated in S501. In a case that the transmitted printing data does not have the same content as the printing data generated in S501, the printer driver 33a executes the process of S502. In a case that the data which has been printed has the same content as the printing data generated in S501, the printer driver 33a executes the process of S506. S505 is an example of a data comparison process.

In S506, the printer driver 33a cancels the transmission of the printing data generated in S501. In a case that the transmission of the printing data generated in S501 is canceled, the user is desirably informed of the cancellation.

According to the printer driver 33a of the fifth embodiment as described above, in a case that the remaining battery level of the battery 19 is less than the reference remaining level and that the transmitted printing data has the same content as the printing data to be transmitted (which is generated in S501), the printing data to be transmitted is not transmitted. Thus, it is possible to save the electric power consumed by the transmission of the printing data to be transmitted.

Other Embodiments

The technical scope of the present teaching is not limited to the embodiments explained through the above descriptions and drawings but, for example, the following embodiments are also included.

In S107 of the first embodiment, the printer driver 33a instructs the OS 31 to perform the switching to the USB port 42 via the port setting service 33b. On the other hand, instead of instructing the OS 31 to perform the switching to the USB port 42, the printer driver 33a may display guidance message to instruct the user to switch the input/output port to the USB port 42. In this case, the user inputs an instruction on the unillustrated setting screen displayed by the OS 31 to instruct the OS 31 to perform the switching of the input/output port. The same is applied to the third and fourth embodiments as well.

In S104 of the first embodiment, the printer driver 33a judges as to whether or not the remaining battery level of the battery 19 is not less than the second reference remaining level. This judgment, however, may not be performed. That is, in a case that it is judged in S103 that the remaining battery level is less than the first reference remaining level, the printer driver 33a may perform the process of S105 immediately.

In S105 of the first embodiment, the printer driver 33a judges as to whether or not the portable PC 1 includes the USB host interface section 16. However, in a case that it is already known that the portable PC 1 includes the USB host interface section 16, the printer driver 33a may perform the process of S106 without performing the judgment.

In S101 of the first embodiment, the printer driver 33a judges as to whether or not the input/output port used for the transmission of the data is the TCP/IP port 41; and in S102 and S103, the printer driver 33a judges the remaining battery level of the battery 19. The printer driver 33a, however, may execute the process of S101 after performing the processes of S102 and S103.

In the first embodiment, the explanation was made by citing the case in which the first input/output port is the TCP/IP port 41 and the second input/output port is the USB port 42. However, the following combination is also allowable. That is, for example, the first input/output port is the TCP/IP port (wireless LAN) and the second input/output port is any one of the file port, the serial port, and a printer port.

Alternatively, the following combination is also allowable. That is, the first input/output port is a blue-tooth port and the second input/output port is any one of the USB port, the file port, the serial port, the printer port, and the TCP/IP port (wired LAN). The second input/output port may be any input/output port provided that the second input/output port has the power consumption required for the input/output of the data which is smaller than that of the first input/output port. In other words, the first input/output port may be any input/output port provided that the power consumption required for the input/output of the data is greater than that of the second input/output port.

In the first embodiment, the explanation was made by citing the case in which the USB host interface section 16 and the printer 2 are connected by the USB cable 52. However, a USB mass storage device such as the USB memory and a USB hard disk may be directly connected to the USB host interface section 16. In this case, the printing data is written into the USB mass storage device.

In each of the first to fifth embodiments, the explanation was made by citing a case in which the printing data is transmitted to the printer 2. The technique disclosed in the present description, however, can be applied to a case in which the data is received from the external device. In particular, the technique disclosed in the present description can be applied to a case in which the file is downloaded from the external server. The input/output setting program may be, for example, a scanner driver controlling an image scanner and the port setting service 33b. In this case, in a case that a document is read by the image scanner and a generated image data is received, the input/output port or the communication control program is switched depending on the remaining battery level.

In S110 of the first embodiment, the printer driver 33a performs the switching of the input/output port to the file port. However, instead of performing the switching to the file port, the user may be instructed to perform the switching to the file port.

In each of the first to fifth embodiments, the explanation was made by citing the portable PC 1 as the data processing apparatus. The data processing apparatus, however, may be a mobile phone or a mobile information terminal.

What is claimed is:

1. A non-transitory computer readable medium storing instructions that, when executed, cause a data processing apparatus, which includes a first input/output section for performing input/output of data, includes a storage section and which is driven by a battery, to:

judge whether the first input/output section is set as an input/output section used for the input/output of the data;

judge whether a remaining battery level of the battery is not less than a first reference remaining level;

judge whether the data processing apparatus includes a second input/output section requiring a power consumption which is used for the input/output of the data and which is lower than that of the first input/output section, in a case that the data processing apparatus judges that the first input/output section is set as the input/output section used for the input/output of the data and that the remaining battery level is less than the first reference remaining level;

switch the input/output section from the first input/output section to the second input/output section or output a notification to switch the input/output section from the first input/output section to the second input/output section, in a case that the data processing apparatus judges that the data processing apparatus includes the second input/output section, create a logical third input/output section which outputs the data by writing the data into the storage section, in a case that the data processing apparatus judges that the data processing apparatus does not include the second input/output section; and switch the input/output section from the first input/output section to the third input/output section or output a notification to switch the input/output section from the first input/output section to the third input/output section.

2. The non-transitory computer readable medium according to claim 1, wherein the data processing apparatus further includes a first input/output port which performs the input/output of the data by using the first input/output section; and the instructions cause the data processing apparatus to:

judge whether the first input/output port is set as a logical input/output port used for the input/output of the data; and switch the logical input/output port from the first input/output port to a second input/output port which performs the input/output of the data by using the second input/output section or output a notification to switch the logical input/output port from the first input/output port to the second input/output port, in a case that the data processing apparatus judges that the first input/output port is set as the logical input/output port; that the remaining battery level is less than the first reference remaining level; and that the data processing apparatus includes the second input/output section.

3. The non-transitory computer readable medium according to claim 1,
wherein the data processing apparatus further includes a first communication control program which controls the first input/output section to perform the input/output of the data; and
the instructions cause the data processing apparatus to:
judge as to whether or not the first communication control program is set as a communication control program used for the input/output of the data; and
switch the communication control program from the first communication control program to a second communication control program which controls the second input/output section to perform the input/output of the data or output a notification to switch the communication control program from the first communication control program to the second communication control program, in a case that the data processing apparatus judges that the first communication control program is set as the communication control program used for the input/output of the data; that the remaining battery level is less than the first reference remaining level; and that the data processing apparatus includes the second input/output section.

4. The non-transitory computer readable medium according to claim 1,
wherein the second input/output section is an input/output section to which an external device is directly installed to perform the input/output of the data or an input/output section to which a communication cable is connected to be connected to the external device via the communication cable to perform the input/output of the data; and
the instructions cause the data processing apparatus to output a notification to directly install the external device to the data processing apparatus or to output a notification to connect the communication cable to the data processing apparatus, in a case that the instructions cause the data processing apparatus to output the notification to switch the input/output section from the first input section to the second input section.

5. The non-transitory computer readable medium according to claim 1,
wherein
the instructions cause the data processing apparatus to:
judge whether the remaining battery level is not less than a second reference remaining level which is lower than the first reference remaining level, in a case that the data processing apparatus judges that the remaining battery level is less than the first reference remaining level;
switch the input/output section from the first input/output section to the second input/output section or output a notification to switch the input/output section from the first input/output section to the second input/output section, in a case that the data processing apparatus judges that the first input/output section is set as the input/output section used for the input/output of the data; that the remaining battery level is less than the first reference remaining level and is not less than the second reference remaining level; and that the data processing apparatus includes the second input/output section; and
switch the input/output section from the first input/output section to the third input/output section or output a notification to switch the input/output section from the first input/output section to the third input/output section, in a case that the data processing apparatus judges that the remaining battery level is less than the second reference remaining level and that the data processing apparatus does not include the second input/output section.

6. The non-transitory computer readable medium according to claim 1,
wherein the data processing apparatus further includes a storage section; and
the instructions cause the data processing apparatus to:
store, in the storage section, an input/output history indicating that the input/output of the data is performed by the first input/output section; judge a state of input/output which indicates at least one of the number of times of the input/output of the data and a frequency of the input/output of the data by the first input/output section based on the input/output history;
judge whether the state of input/output is not less than a reference value; and
judge the remaining battery level and one of switching the input/output section and outputting the notification to switch the input/output section, in a case that the data processing apparatus judges that the first input/output section is set as the input/output section used for the input/output of the data and that the state of input/output is not less than the reference value.

7. The non-transitory computer readable medium according to claim 1, wherein the instructions further cause the data processing apparatus to judge whether the data processing apparatus includes the logical third input/output section before creating the logical third input/output section.

8. A non-transitory computer readable medium storing instructions that, when executed, cause a data processing apparatus, which includes a first input/output section for performing input/output of data and which is driven by a battery, to:
judge whether the first input/output section is set as an input/output section used for the input/output of the data;
judge whether a remaining battery level of the battery is not less than a first reference remaining level;
judge whether the data processing apparatus includes a second input/output section requiring a power consumption which is used for the input/output of the data and which is lower than that of the first input/output section, in a case that the data processing apparatus judges that the first input/output section is set as the input/output section used for the input/output of the data and that the remaining battery level is less than the first reference remaining level;
switch the input/output section from the first input/output section to the second input/output section or output a notification to switch the input/output section from the first input/output section to the second input/output section, in a case that the data processing apparatus judges that the data processing apparatus includes the second input/output and
prohibit the input/output of the data, in a case that the data processing apparatus judges that the first input/output section is set as the input/output section; that the remaining battery level is less than the first reference remaining level; and that the data processing apparatus does not include the second input/output section.

9. A data processing apparatus which is driven by a battery, comprising:
- a first input/output section configured to perform input/output of data;
- a storage section; and
- a controller configured to:
    - judge whether the first input/output section is set as an input/output section used for the input/output of the data;
    - judge whether a remaining battery level of the battery is not less than a first reference remaining level;
    - judge whether the data processing apparatus includes a second input/output section requiring a power consumption which is used for the input/output of the data and which is lower than that of the first input/output section, in a case that the data processing apparatus judges that the first input/output section is set as the input/output section used for the input/output of the data and that the remaining battery level is less than the first reference remaining level;
    - switch the input/output section from the first input/output section to the second input/output section or output a notification to switch the input/output section from the first input/output section to the second input/output section, in a case that the controller judges that the data processing apparatus includes the second input/output section;
    - create a logical third input/output section which outputs the data by writing the data into the storage section, in a case that the controller judges that the data processing apparatus does not include the second input/output section; and
    - switch the input/output section from the first input/output section to the third input/output section or output a notification to switch the input/output section from the first input/output section to the third input/output section.

* * * * *